(12) United States Patent
Featherstone et al.

(10) Patent No.: US 11,194,322 B2
(45) Date of Patent: Dec. 7, 2021

(54) PROFILING OF PACKAGING SYSTEMS

(71) Applicant: Packsize LLC, Salt Lake City, UT (US)

(72) Inventors: Chris R. Featherstone, Highland, UT (US); Clinton P. Smith, Highland, UT (US); Robert Lingstuyl, Salt Lake City, UT (US); Jeffrey Lee Rasmussen, West Jordan, UT (US)

(73) Assignee: PACKSIZE LLC, Salt Lake City, UT (US)

( * ) Notice: Subject to any disclaimer, the term of this patent is extended or adjusted under 35 U.S.C. 154(b) by 385 days.

(21) Appl. No.: 15/568,473

(22) PCT Filed: Apr. 27, 2016

(86) PCT No.: PCT/US2016/029467
§ 371 (c)(1),
(2) Date: Oct. 21, 2017

(87) PCT Pub. No.: WO2016/176271
PCT Pub. Date: Nov. 3, 2016

(65) Prior Publication Data
US 2018/0113447 A1     Apr. 26, 2018

Related U.S. Application Data

(60) Provisional application No. 62/154,368, filed on Apr. 29, 2015.

(51) Int. Cl.
*G05B 23/02* (2006.01)
*B31F 1/20* (2006.01)
(Continued)

(52) U.S. Cl.
CPC ........ *G05B 23/0294* (2013.01); *B31B 50/005* (2017.08); *B31B 50/006* (2017.08);
(Continued)

(58) Field of Classification Search
CPC .......... G05B 23/0294; G06Q 10/0633; G06Q 10/087; G06Q 10/20; B31B 50/005;
(Continued)

(56) References Cited

U.S. PATENT DOCUMENTS 5,150,302 A * 9/1992 Adachi ............ G05B 19/41835
700/127
5,893,047 A * 4/1999 Gimblett ............ G05B 19/0428
700/130
(Continued)

FOREIGN PATENT DOCUMENTS

| IT | BO970744 A1 | 6/1999 |
|---|---|---|
| JP | 2011118763 | 6/2011 |
| WO | 1999017923 | 4/1999 |

OTHER PUBLICATIONS

Tinga et al., "Application of physical failure models to enable usage and load based maintenance", Reliability Engineering and System Safety, Elsevier Applied Science, GB, vol. 95, No. 10, Oct. 1, 2010, pp. 1061-1075, XP027108262, ISSN: 0951-8320 [retrieved on Jun. 26, 2010] abstract; figure 3.

(Continued)

*Primary Examiner* — Thanh K Truong
*Assistant Examiner* — Scott A Howell
(74) *Attorney, Agent, or Firm* — Workman Nydegger (57) ABSTRACT

A method for monitoring equipment and gathering consumption and diagnostic information can comprise receiving, at a server, a corrugate usage indicator. The corrugate usage indicator can comprise information relating to an amount of corrugate used by a first packaging system. The
(Continued)

method can also comprise creating a usage profile for the first packaging system. The usage profile can comprise a corrugate usage profile. The corrugate usage profile can comprise an association between the amount of corrugate used by the first packaging system and the specifications and number of boxes created. Additionally, the method can comprise automatically generating, based upon the corrugate usage profile, a predicted time when a stock of corrugate associated with the first packaging system will be depleted.

18 Claims, 4 Drawing Sheets

(51) Int. Cl.
| | |
|---|---|
| *B65B 5/02* | (2006.01) |
| *B65B 43/10* | (2006.01) |
| *B31B 50/00* | (2017.01) |
| *G06Q 10/08* | (2012.01) |
| *G06Q 10/00* | (2012.01) |
| *B65B 59/00* | (2006.01) |
| *G06Q 10/06* | (2012.01) |

(52) U.S. Cl.
CPC ............. *B31F 1/20* (2013.01); *B65B 5/02* (2013.01); *B65B 43/10* (2013.01); *B65B 59/001* (2019.05); *G06Q 10/0633* (2013.01); *G06Q 10/087* (2013.01); *G06Q 10/20* (2013.01); *B65B 2210/04* (2013.01)

(58) Field of Classification Search
CPC ......... B31B 50/006; B31F 1/20; B65B 43/10; B65B 59/00; B65B 5/02; B65B 2210/04
USPC .............. 493/3; 700/143, 127, 128
See application file for complete search history.

(56) References Cited

U.S. PATENT DOCUMENTS

| | | | | |
|---|---|---|---|---|
| 6,308,138 | B1* | 10/2001 | Jones | G05B 19/4065 |
| | | | | 700/174 |
| 6,591,157 | B1* | 7/2003 | Vivirito | B26D 5/00 |
| | | | | 700/175 |
| 6,840,898 | B2 | 1/2005 | Pettersson | |
| 7,117,872 | B2 | 10/2006 | Draghetti et al. | |
| 7,401,066 | B2* | 7/2008 | Beinglass | H01L 22/20 |
| | | | | 257/E21.525 |
| 7,996,108 | B2 | 8/2011 | Yardley | |
| 8,032,248 | B2* | 10/2011 | Lee | G06Q 10/06 |
| | | | | 700/174 |
| 8,073,239 | B1 | 12/2011 | Bahrami et al. | |
| 8,165,968 | B2* | 4/2012 | Ramesh | G06Q 10/0631 |
| | | | | 705/400 |
| 8,647,246 | B2* | 2/2014 | Murray | B31B 50/60 |
| | | | | 493/6 |
| 9,573,287 | B2* | 2/2017 | Asai | B26D 7/26 |
| 10,002,207 | B2* | 6/2018 | Pettersson | G06F 17/50 |
| 2003/0114288 | A1 | 6/2003 | Harding et al. | |
| 2005/0114193 | A1 | 5/2005 | Kroening | |
| 2007/0270991 | A1* | 11/2007 | Dye | B65B 55/20 |
| | | | | 700/108 |
| 2013/0000252 | A1* | 1/2013 | Pettersson | B65B 5/024 |
| | | | | 53/396 |
| 2013/0233922 | A1 | 9/2013 | Schoening et al. | |
| 2014/0336026 | A1 | 11/2014 | Pettersson | |
| 2014/0336791 | A1* | 11/2014 | Asenjo | G06Q 10/06 |
| | | | | 700/44 |
| 2018/0245434 | A1* | 8/2018 | Jacks | E21B 41/00 |

OTHER PUBLICATIONS

Annonymous: "Tool wear—Wikipedia", Mar. 4, 2015 XP055606364, retrieved from the internet URL: https://en.wikipedia.org/w/index.php?title=Tool_wear&oldid+649812460 [retreived on Jul. 17, 2019].
United States International Search Authority, International Search Report and Written Opinion, PCT/US2016/029467, Date Completed Sep. 8, 2016, dated Oct. 4, 2016.

* cited by examiner

PROFILING OF PACKAGING SYSTEMS

CROSS-REFERENCE TO RELATED APPLICATIONS

This application claims priority to PCT Application Ser. No. PCT/US2016/029467, filed Apr. 27, 2016, entitled "PROFILING OF PACKAGING SYSTEMS", which claims the benefit of and priority to U.S. Provisional Application Ser. No. 62/154,368, filed Apr. 29, 2015, entitled "PROFILING OF PACKAGING SYSTEMS". All the aforementioned applications are incorporated by reference herein in their entirety.

BACKGROUND

1. Technical Field

Exemplary embodiments of the invention relate to systems, methods, and devices for packaging orders.

2. Background and Relevant Art

Shipping and packaging industries frequently use paperboard and other fanfold material processing equipment that converts fanfold materials into box templates. One advantage of such equipment is that a shipper may prepare boxes of required sizes as needed in lieu of keeping a stock of standard, pre-made boxes of various sizes. Consequently, the shipper can eliminate the need to forecast its requirements for particular box sizes as well as to store pre-made boxes of standard sizes. Instead, the shipper may store one or more bales of fanfold material, which can be used to generate a variety of box sizes based on the specific box size requirements at the time of each shipment. This allows the shipper to reduce storage space normally required for periodically used shipping supplies as well as reduce the waste and costs associated with the inherently inaccurate process of forecasting box size requirements, as the items shipped and their respective dimensions vary from time to time.

In addition to reducing the inefficiencies associated with storing pre-made boxes of numerous sizes, creating custom sized boxes also reduces packaging and shipping costs. In the fulfillment industry it is estimated that shipped items are typically packaged in boxes that are about 40% larger than the shipped items. Boxes that are too large for a particular item are more expensive than a box that is custom sized for the item due to the cost of the excess material used to make the larger box. When an item is packaged in an oversized box, filling material (e.g., Styrofoam, foam peanuts, paper, air pillows, etc.) is often placed in the box to prevent the item from moving inside the box and to prevent the box from caving in when pressure is applied (e.g., when boxes are taped closed or stacked). These filling materials further increase the cost associated with packing an item in an oversized box.

Custom-sized boxes also reduce the shipping costs associated with shipping items compared to shipping the items in oversized boxes. A shipping vehicle filled with boxes that are 40% larger than the packaged items is much less cost efficient to operate than a shipping vehicle filled with boxes that are custom sized to fit the packaged items. In other words, a shipping vehicle filled with custom sized packages can carry a significantly larger number of packages, which can reduce the number of shipping vehicles required to ship that same number of items. Accordingly, in addition or as an alternative to calculating shipping prices based on the weight of a package, shipping prices are often affected by the size of the shipped package. Thus, reducing the size of an item's package can reduce the price of shipping the item.

Although sheet material processing machines and related equipment can potentially reduce inconveniences and costs associated with stocking and using standard sized shipping supplies, the process for making and using custom-made, Just-in-time packaging templates can nevertheless be improved through the comprehensive tracking of material and machine use.

BRIEF SUMMARY OF THE INVENTION

This disclosure relates to systems, methods, and devices for processing paperboard (such as corrugated cardboard) and similar fanfold materials and converting the same into packaging templates. In particular, embodiments described within the disclosure teach a comprehensive data gathering system that tracks various metrics within a packaging system. The gathered data can be used to predict potential system failures before they occur and to optimize system performance. Accordingly, in at least one embodiment, a packaging system can be economically optimized.

In at least one embodiment, a method for monitoring equipment and gathering consumption and diagnostic information can comprise receiving, at a server, a corrugate usage indicator. The corrugate usage indicator can comprise information relating to an amount of corrugate used by a first packaging system. The method can also comprise creating a usage profile for the first packaging system. The usage profile can comprise a corrugate usage profile. The corrugate usage profile can comprise an association between the amount of corrugate used by the first packaging system and the specifications and number of boxes created. Additionally, the method can comprise automatically generating, based upon the corrugate usage profile, a predicted time when a stock of corrugate associated with the first packaging system will be depleted.

Additionally, in at least one implementation, a method for monitoring equipment and gathering consumption and diagnostic information can comprise receiving a production indicator. The production indicator can comprise information relating to an amount and types of boxes created by a first packaging system. Additionally, the method can comprise receiving a tool indicator. The tool indicator can comprise information received from a first tool describing the depths of cuts and the lengths of cuts that the first tool has performed. In addition, the method can comprise creating a usage profile for the first packaging system. The usage profile can comprise a tool wear profile. The tool wear profile can comprise a predicted wear for the first tool based upon at least the depths of cuts and the lengths of cuts that the first tool has performed and the type of corrugate the first tool has processed. Further, the method can comprise automatically creating a service order to service the first tool before the first tool is predicted to fail.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. For better understanding, like elements have been designated by like reference numbers throughout the various accompanying figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The embodiments described herein generally relate to systems, methods, and devices for processing paperboard (such as corrugated cardboard) and similar fanfold materials and converting the same into packaging templates. In particular, embodiments described within the disclosure teach a comprehensive data gathering system that tracks various metrics within a packaging system. The gathered data can be used to predict potential system failures before they occur and to optimize system performance. Accordingly, in at least one embodiment, a packaging system can be economically optimized.

Figure 1:
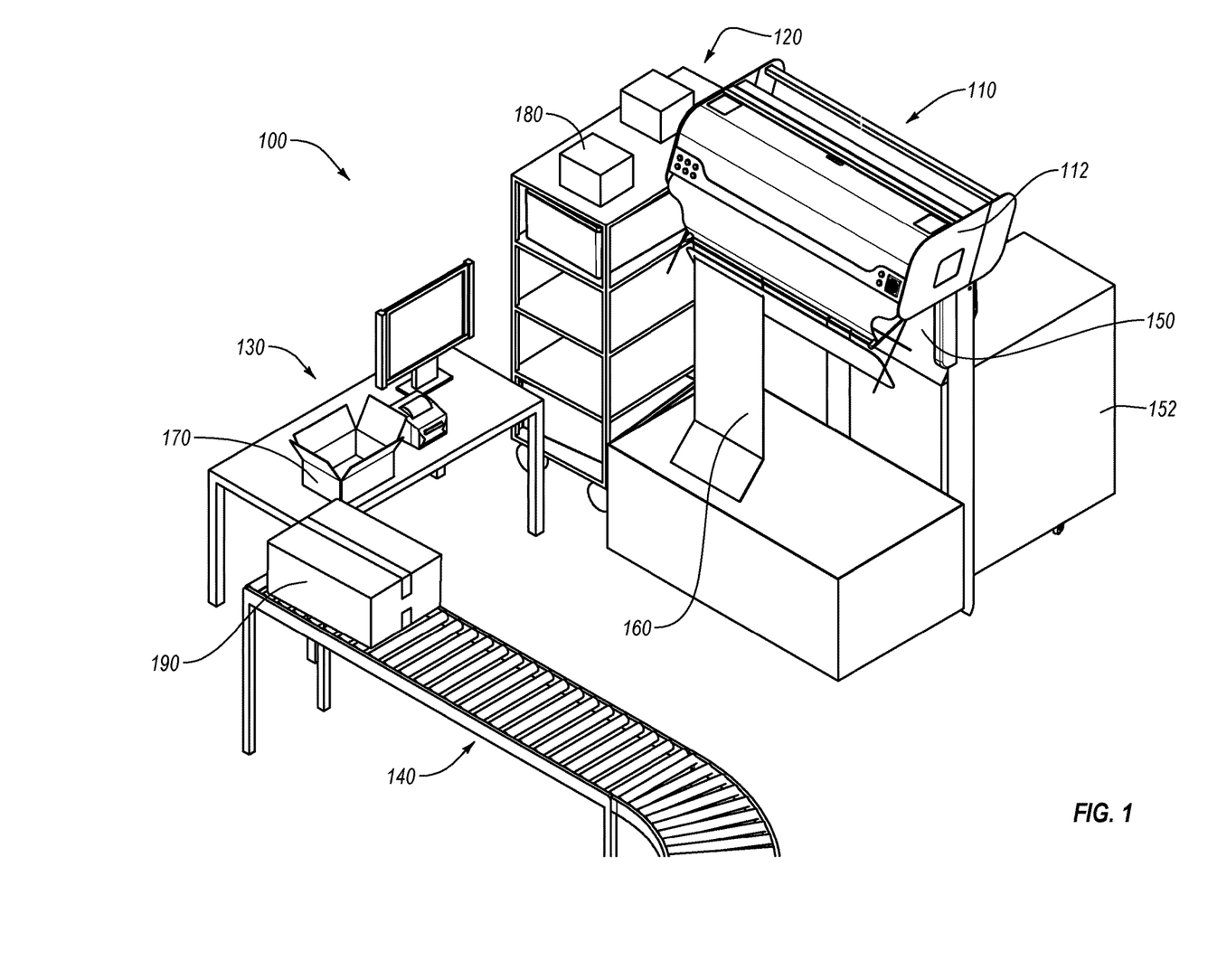
FIG. 1 illustrates a packaging cell in accordance with at least one implementation of the present invention.

Generally, as illustrated in FIG. 1, a shipper can have one or more packaging cells 100, which can include equipment for packaging available orders and preparing the same for shipment. For example, the packaging cell 100 can include a packaging system 110, an available-order transport system 120, a work area 130, a tracking-code scanner 132, and a processed-order transport system 140. The packaging system 110 can include a converting machine 112 that can receive fanfold material 150 from one or more bales 152. The packaging system 110 can process the fanfold material 150 into packaging templates 160. An operator can retrieve the packaging templates 160 from the packaging system 110 and can form boxes 170 for shipment of available orders 180. As used herein, the term "available order" refers to any order (whether a single-item order or multi-item order) that can be processed as one unit by the shipper.

The available-order transport system 120 can transport various available orders 180 to the work area 130 for packaging and preparation for shipment. In some embodiments, the available-order transport system 120 can be a conveyor system or movable shelving system that can transport the available orders 180 to the work area 130. When the available orders 180 arrive at the work area 130, the operator can request packaging templates 160 to be prepared by the packaging system 110. In at least one embodiment, an operator requests the packaging templates 160 by scanning, with the tracking-code scanner 132, a code associated with each respective available-order 180. As further described below, such packaging templates 160 can be custom-sized based on the particular dimensions of the available orders 180 to be packaged.

In addition to packaging the available orders 180, the operator can prepare the available orders 180 for shipment by attaching required labels and other materials. Once the available order 180 is processed (i.e., packaged and/or prepared for shipment), such processed order 190 can be transported away from the work area 130 via the processed-order transport system 140. For instance, the processed-order transport system 140 can transport the processed orders 190 to a shipping area. In some implementations, the processed-order transport system 140 can be a conveyor belt that can connect the work area 130 and a desired location for the processed orders 190. In other embodiments, the processed-order transport system 140 can be a movable shelving system that can transport the processed orders 190 away from the work area 130.

Figure 2:
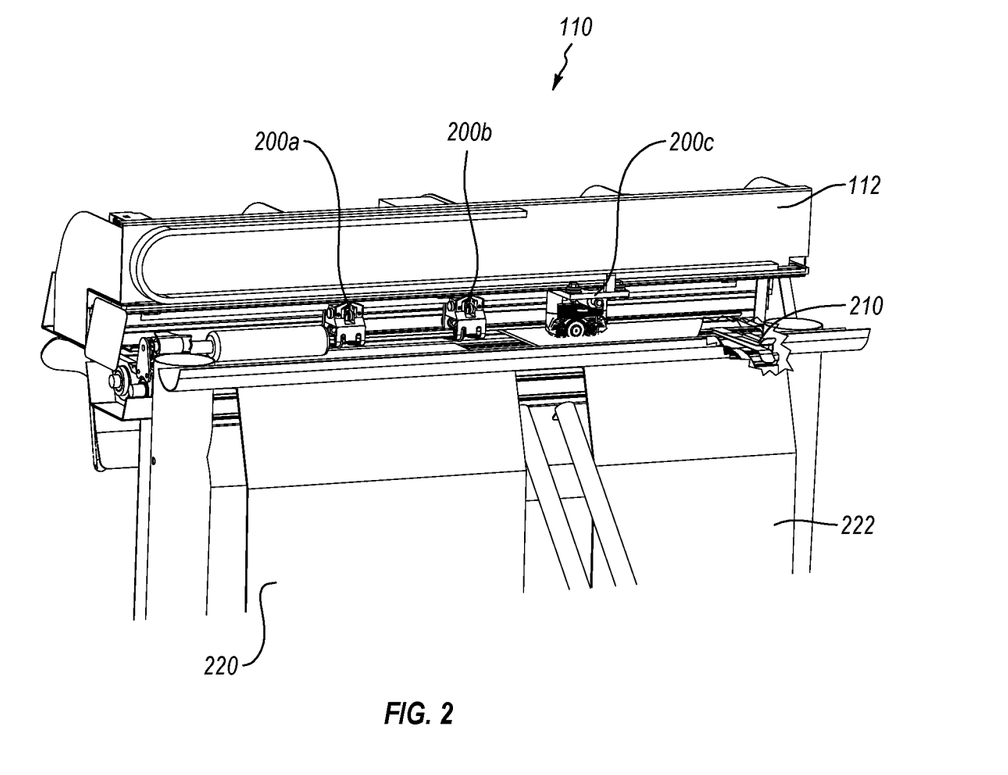
FIG. 2 illustrates a converting machine in accordance with at least one implementation of the present invention.

FIG. 2 depicts another perspective of a converting machine 112. The perspective of FIG. 2 depicts various cutting and creasing tools 200(a-c) and a cutaway perspective of a corrugate feeding tool 210. Additionally, the converting machine 112 is depicted receiving corrugate of various sizes. For example, a first size of corrugate 220 is being fed into a left side of the converting machine 112, and a second size of corrugate 222 is being fed into a right side of the converting machine 112.

In at least one implementation, the packaging system 110 automatically selects the appropriate corrugate type and size 220, 222 based upon the desired packaging template. For instance, a particular packaging template may require the larger corrugate size of the first feed 220. In contrast, the smaller corrugate size of the second feed 222 may be sufficient for a smaller packaging template.

In at least one embodiment different corrugate thicknesses may also be fed into the packaging system 110. For example, the first corrugate feed 220 may comprise corrugate that is thicker than the corrugate in the second corrugate feed 222. The thicker corrugate can be used to package heavy products, hard products, or products with sharp edges. In at least one implementation, the packaging system automatically selects the proper corrugate thickness based upon the items that are to be boxed.

When an indication to build a packaging template is received, the packaging system 110 generates the packaging template by controlling and actuating the cutting and creasing tools 200(a-c) and the corrugate feeding tool 210. In particular, the cutting and creasing tools 200(a-c) can receive instructions that dictate a location at which to engage the corrugate, a physical length or duration of time at which to engage the corrugate, and a depth or pressure of engagement. In at least one implementation, the difference between a cut or crease in the finished packaging template is determined by the depth or pressure at which a cutting and creasing tool 200(a-c) engages the corrugate. For example, a shallow engagement by the cutting and creasing tool 200(a-c) may result in a crease. In contrast, a deep engagement by the cutting and creasing tool 200(a-c) may result in a cut.

In at least one implementation, the cutting and creasing tools 200(*a-c*) comprise a pressure and/or depth sensor that controls the engagement of the tool with corrugate that is fed into the system. The pressure and/or depth sensor may comprise one or more pressure sensors on a pneumatic system that actuates the various movements of the cutting and creasing tools 200(*a-c*). Accordingly, a packaging template can be created by adjusting the location, duration, and level of engagement of the cutting and creasing tools 200(*a-c*) with the corrugate.

In at least one implementation, as the cutting and creasing tools 200(*a-c*) are used and become worn, the packaging system 110 can compensate by increasing the pressure and/or depth of engagement to compensate for a worn blade. One will understand, however, that with repeated and continuous use, eventually the cutting and creasing tools 200(*a-c*) each will require replacement. Additionally, one will understand that continuously having replacement tools on hand can incur significant storage and handling costs. In contrast, not having a replacement tool available in a time of need can also incur significant costs due to the shut down of a converting machine 112.

Similar to the cutting and creasing tools 200(*a-c*), the corrugate feeding tool 210 can also comprise various sensors used to control the rate at which the corrugate is fed into the packaging system 110. For example, the corrugate feeding tool 210 can comprise a feed rate sensor. The feed rate sensor can indicate the amount of corrugate that is fed into the packaging system 110 for a given amount of time. The first corrugate feed 220 may be fed into the packaging system 110 by a corrugate feeding tool that is separate from the corrugate feeding tool that is used in relation to the second corrugate feed 222. As such, the packaging system 110 can independently track the amount of each corrugate type that is fed into the packaging system 110.

In at least one embodiment, the corrugate feeding tool 210 may comprise a high friction surface that is meant to engage with various corrugate types. The high friction surface may comprise sufficient friction to force-feed corrugate into the converting machine 112. One will understand that after frequent and extended use the high friction surface, along with other corrugate feeding tool components, may need replacement.

As mentioned above, packaging systems that can create custom, on-demand boxes provide significant benefits in efficiency and cost. In at least one implementation, however, maintaining the packaging systems can provide unique and difficult challenges. For example, in contrast to conventional packaging systems that create only a single box type, implementations of packaging systems described herein create a wide variety of different box types using different corrugates types.

The large and somewhat unpredictable variety of boxes the packaging systems can create can cause significant difficulties when predicting maintenance cycles for the packaging systems and when attempting to project overall costs. For instance, within a conventional packaging system that only creates a particular box type using a particular corrugate, it is trivial to predict the expected maintenance cycle of the packaging system based upon past performance. In contrast, implementations of the packaging systems described herein can create a huge variety of different boxes with different corrugate types all within a single day.

Accordingly, implementations of the present invention provide for a system for monitoring and accumulating usage data from a variety of different packaging systems. The gathered data can be analyzed to identify maintenance patterns among the different packaging systems. Implementations of the present invention can then preemptively create service orders to perform preventative maintenance on packaging machines 110. As such, efficiencies within packaging systems of the present invention can be optimized by preventing maintenance issues from growing into machine failures.

One will understand that while maintenance of cutting and creasing tools 200(*a-c*) and corrugate feeding tools 210 was described above, in at least one implementation any component of the packaging system 110 can similarly be monitored and maintained. Similarly, replacement corrugate stock can be automatically ordered before the stock depletes.

Figure 3:
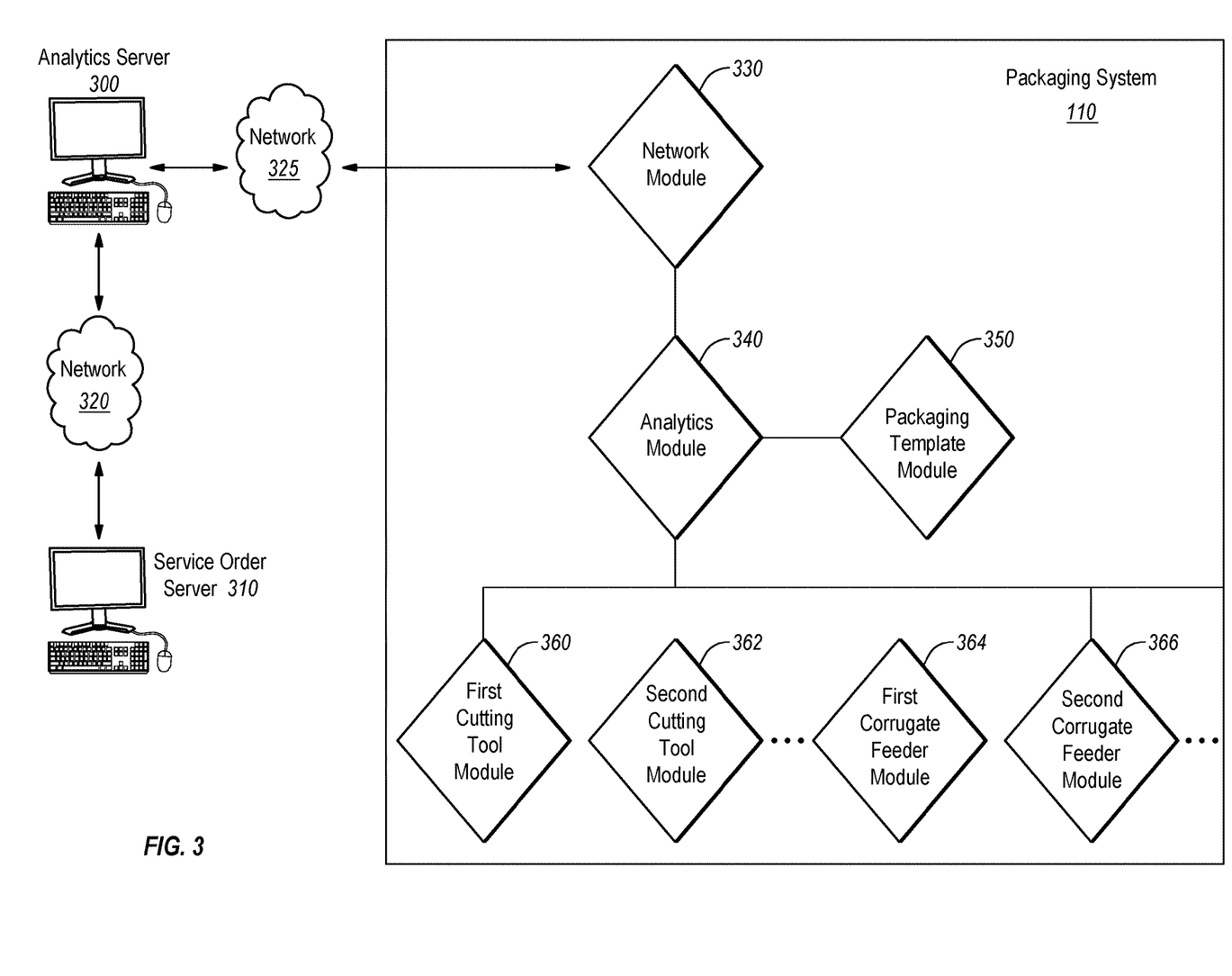
FIG. 3 illustrates a system for receiving and analyzing data in accordance with at least one implementation of the present invention.

FIG. 3 depicts an analytics server 300 in communication with a to packaging system 110 through a network 325. The analytics server 300 is also depicted as being in communication with a service order server 310 through network 320. While shown as distinct components communicating through a network, in at least one implementation, the analytic server 300 and the service order server 310 can comprise a single computing system. Additionally, in at least one implementation, the analytics server 300 and/or the service order server 310 may comprise a cloud server solution.

The packaging system 110 of FIG. 3 comprises various symbolic modules. One will understand that the modules are provided for the sake of illustration and clarity. The nature of modules, however, is such that in other implementations the modules can be otherwise combined or separated and still perform the functions described within this application.

The packaging system 110 can comprise a network module 330, an analytics module 340, a packaging template module 350, a first cutting tool module 360, a second cutting tool module 362, a first corrugate feeder module 364, and a second corrugate feeder module 366. One will understand, as indicated by the ellipses within the packaging system 110, that various embodiments of the packaging system 110 may comprise additional cutting tool modules and corrugated feeder modules.

In at least one embodiment, the analytics server 300 receives production information from the packaging system 110 through network 325. In particular, the packaging system 110 transmits to the analytic server 300 information received from the analytics module 340. The analytics module 340 may receive production information from the cutting tool modules 362, 360 and the corrugate feeder modules 364, 366.

For example, the analytics module 340 may receive from the first cutting tool module 360 information relating to the lengths of cuts made by the first cutting and creasing tool, the level of engagement of the first cutting and creasing tool, the type of corrugate processed by the first cutting and creasing tool, and other similar first cutting and creasing tool parameters. Similarly, the analytics module 340 may receive information from the first corrugate feeder module 364 relating to the amount of corrugate fed by the first corrugate feeding tool, the type of corrugate fed by the first corrugate feeding tool, and other similar parameters relating to the first corrugate feeding tool. Additionally, the analytics module 340 may receive to information relating to the cost per box based upon the amount of corrugate used, the amount of waste per box, how many packaging templates were created per time period, how many boxes per track were created, how long each packaging system ran in a given time period, how much filler was used in each box, and other similar data points.

Additionally, the analytics module 340 can receive production information from the packaging template module 350. For example, the packaging template module 350 can provide information relating to the types of packaging templates created, the contents of the various finished boxes, failure information relating to various finished boxes, and other similar production information. These various data points can be sent by the analytics module 340 to the network module 330 and from there sent to the analytics server 300.

The analytics server 300 may be configured to receive information from a plurality of different packaging systems 110 integrated into a variety of different organizations' packing and shipping lines. For example, the analytics server 300 can receive information from a variety of different packaging systems 110 relating to the failure rate of various cutting and creasing tools 200(a-c), the failure rate of various corrugate feeding tools 210, and other diagnostic information relating to the packaging systems 110.

Additionally, the analytics server 300 can receive information relating to the failure rate of various boxes that were created by the various packaging systems 110. In at least one implementation, the box failure information is initially gathered by a parcel delivery service. For example, a delivery service may use a package shipping system that also gathers data relating to box damage that occurs during shipment.

Further, in at least one implementation, the analytics server 300 can receive information relating to the packaging template production of the various packaging systems 110. For example, the analytic server 300 can receive information relating to the types of boxes created, the types of products package within each box, the weight of boxes that were created and packed, and other similar production information. In at least one implementation, at least part of the production information can be directly associated with individual boxes. For instance, the analytic server 300 may receive information indicating the specific contents within a specific box.

Using the production information, the diagnostic information, and the box failure information, the analytics server 300 can identify various trends and automatically issue commands and prompts to improve efficiency within the various packaging systems 110. For instance, the analytic server 300 can identify an average productive life for a cutting and creasing tool 200(a-c) based upon the type of corrugate cut, the amount of core get cut, and other similar variables.

Once an average cutting and creasing tool life has been determined, the analytics server 300 can automatically initiate a service order to replace a cutting increasing tool within a packaging system 110 before the cutting and creasing tool fails. Additionally, the analytics server 300 can account for the type of corrugate cut, the amount of corrugate cut, and other similar variables, when determining a predicted cutting and creasing tool life.

Similar to issuing a service order for a cutting and creasing tool 200(a-c), the analytics server 300 can also track and predict the useful life of a corrugate feeding tool 210. For example, the analytic server 300 can determine an average expected life of a corrugate feeding tool 210 based upon previously identified failures of other corrugate feeding tools. Additionally, the average expected life of a particular corrugate feeding tool 210 can also account for the type and thickness of corrugate that the particular corrugate feeding tool 210 has fed through a converting machine 112.

Additionally, in at least one implementation, the analytics server 300 can automatically order corrugate based upon the amount of corrugate a packaging system 110 has used. For example, the analytics server 300 may access a database of corrugate inventories. The inventories may describe how much corrugate of each type is available to each packaging system 110. Using information received from the corrugate feeding tools 210 and the packaging template module 350, the analytics server 300 can predict the amount of corrugate that has already been used, the amount of unused corrugate remaining in stock, and the amount of time it will likely take to use the remaining corrugate. The analytics server 300 can communicate an order to the service order server 310 to send another shipment of corrugate prior to the packaging system running out.

In at least one implementation, the analytics server 300 can create service orders for a variety of different items based upon the received information. For example, in addition to ordering corrugate, the analytics server 300 can order glue based upon the types and numbers of boxes created. Accordingly, in at least one implementation, the analytics server 300 can predict when a user will need to restock a particular item based upon a knowledge of the users initial stock and a knowledge of the packaging system's usage.

Additionally, in at least one implementation, the analytics server can also assist in requesting shipment trucks and containers. For example, the analytics server can identify the total volume of boxes generated during a particular time period. Based upon the box created and/or the boxed predicted to be made, the analytics server can request one or more trucks of appropriate size.

The ability to centralize this and similar diagnostic information at a single point can provide significant benefits for identifying maintenance schedules and costs. For example, drawing from a plurality of packaging systems 110, each of which may be processing different corrugate types and creating different packaging templates, provides the analytics server 300 with a broad range of information to associate maintenance and production with packaging system use, corrugate type, and box type.

For instance, the analytics server 300 may receive information from a first packaging system that is predominately processing a first type of thick corrugate and a second packaging system that is processing both the first type of thick corrugate and a second type of thin corrugate in varying amounts. Additionally, the analytics server 300 can receive information relating to the types of packaging templates created, the amount of pressure placed on a respective cutting and creasing tool, and the amount of use that each cutting and creasing tool 200(a-c) receives.

Determining the expected life of a cutting and creasing tool 200(a-c) in a packaging system that is continually using different types of corrugate, applying varying levels of pressure onto a cutting and creasing tool 200(a-c), and/or making cuts and creases of different lengths presents an difficult challenge. For example, even within the first packaging system, which predominately uses a single type of corrugate, the life of a cutting and creasing tool in practice may vary widely based upon the number of cuts versus creases that the tool has created. The number of cuts versus tools may similarly widely vary based upon the types of packaging templates that are being created.

Implementations of the present invention can receive information from a wide variety of different packaging systems that are used to create a wide variety of different packaging templates. As large amounts of data is gathered relating to the variety of different corrugates, packaging types, failure rates, etc., the analytics server 300 can identify patterns and statistical correlations between various usage patterns and failure rates. For instance, using information provided by both the first packaging system and the second packaging system described above, the analytics server 300 identify the amount of wear that is attributable to the first type of corrugate versus the second type of corrugate. Further, the analytics server 300 can identify the amount of wear that is attributable to pressure and depth of cut versus pressure and depth of crease.

As the analytics server 300 continues to receive information and feedback from the various packaging systems 110, the analytics server 300 can then predict a failure time for a cutting and creasing tool 200(a-c) based upon the specific usage patterns that the cutting and creasing tool 200(a-c) has experienced. Additionally, the analytics server 300 can also preemptively predict how production changes might impact maintenance and costs for a packaging system.

For example, a user may desire to incorporate a new type of corrugate and/or packaging template into their packaging process. The user may desire to know how the change will impact production level and costs. In at least one implementation, the analytics server 300 can analyze information received from other packaging systems 110 that utilizes similar corrugate and similar packaging template. The analytics server 300 can then predict a maintenance schedule and cost, along with production figures, based upon the types of corrugate and the types of packaging templates that the user intends to produce.

Accordingly, FIGS. 1-3 and the corresponding text illustrate or otherwise describe one or more components, modules, and/or mechanisms for gathering and analyzing data received from a variety of different packaging systems. In particular, in at least one implementation, an analytics server gathers production information from various packaging systems. The analytics server can then analyze the production information and identify correlations between usage patterns and maintenance. Additionally, the analytics server can predict the costs associated with various production schemes. In particular, the analytics server can determine a cost per box for packaging systems, before the system is functioning. One will appreciate that implementations of the present invention can also be described in terms of flowcharts comprising one or more acts for accomplishing a particular result. For example, FIGS. 4 and 5 and the corresponding text describe acts in a method for gathering and analyzing data received from a variety of different packaging systems. The acts of FIGS. 4 and 5 are described below with reference to the elements shown in FIGS. 1-3.

Figure 4:
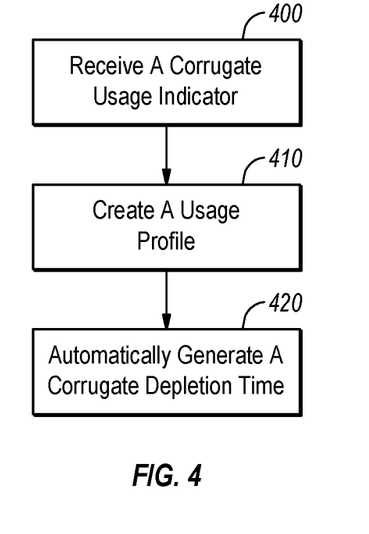
FIG. 4 illustrates a flow chart of a method in accordance with at least one implementation of the present invention.
Figure 5:
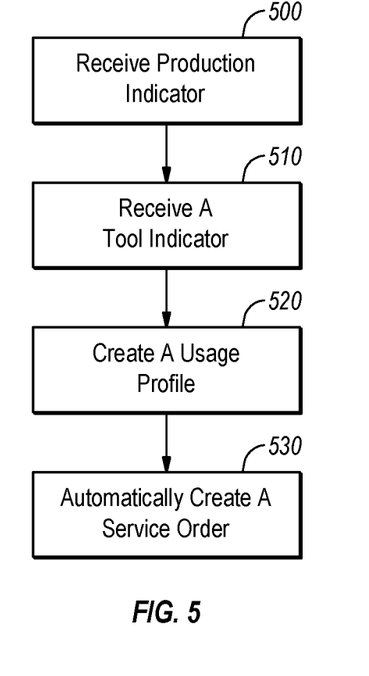
FIG. 5 illustrates another flow chart of a method in accordance with at least one implementation of the present invention.

For example, FIG. 4 illustrates that a method for monitoring equipment and gathering consumption and diagnostic information from a packaging system can include an act 400 of receiving a corrugate usage indicator. Act 400 can comprise receiving, at a server, a corrugate usage indicator. The corrugate usage indicator can comprise information relating to an amount of corrugate used by a first packaging system. For example, as shown in FIG. 3, an analytics server 300 receives through a network 325 information from a packaging system 110. In particular, the analytics server 300 can receive information from the packaging system 110 relating to the amount of corrugate fed into the machine by a first corrugate feeder, the types of patching templates created, and the amount of corrugate waste generated.

Additionally, FIG. 4 shows that the method can include an act 410 of creating a usage profile. Act 410 can include creating a usage profile for the first packaging system. The usage profile can comprise a corrugate usage profile. The corrugate usage profile can further comprise an association between the amount of corrugate used by the first packaging system and the specifications and number of boxes created. For example, the analytics server 300 of FIG. 3 can create a usage profile for packaging system 110. The usage profile can utilize information generated by the packaging template module 350 and the first corrugate feeder module 364. The information provided to the analytics server 300 can then be analyzed to identify correlations between the amount of corrugate used and the types of boxes created.

Further, FIG. 4 shows that the method can include an act 420 of automatically generating a corrugate depletion time. Act 420 can include automatically generating, based upon a corrugate usage profile, a predicted time when a stock of corrugate associated with the first packaging system will be depleted. For example, the analytics server 300 of FIG. 3 can identify the amount of corrugate that has been consumed by packaging system 110 based upon the usage profile. Further, the analytics server 300 can receive information relating to the current stock of corrugate at the first packaging system from the service order server 310. Using information relating to the current stock of corrugate and information relating to the predicted usage of corrugate, the analytics server 300 can predict a time when the stock of corrugate will be depleted.

In addition to the method depicted in FIG. 4, FIG. 5 illustrates that a method for monitoring equipment and gathering consumption and diagnostic information from a packaging system can include an act 500 of receiving a production indicator. Act 500 can include receiving a production indicator that comprises information relating to an amount and types of boxes created by a first packaging system. For example the analytics server 300 depicted in FIG. 3 can receive information from packaging system 110. In particular, the analytics server 300 can receive information relating to the types of boxes created and the number of boxes created.

Additionally, FIG. 5 shows that the method can include an act 510 of receiving a tool indicator. Act 510 can include receiving a tool indicator that comprises information received from a first tool describing the depths of cuts and the lengths of cuts the first tool has performed. For example, the analytics server 300 can receive information from the packaging system 110 that originates at a first cutting tool module 360. The first cutting tool module 360 can be in communication with one or more cutting and creasing tools 200(a-c). Specifically, the first cutting tool module 360 can provide the analytics server with information relating to the use of at least the first tool.

In addition, FIG. 5 also shows that the method can include an act 520 of creating a usage profile. Act 520 can comprise creating a usage profile for the first packaging system. The usage profile can further comprise a tool wear profile that predicts a wear for the first tool based upon at least the depths of cuts and the length of cuts and the type of corrugate that the first tool has processed. For example, in at least one implementation, the analytic server 300 can create a tool wear profile by associating data received from the first cutting tool module 360 with data received from a first corrugate feeder module 364 and/or data received from the packaging template module 350. By associating the received data, the analytics server 300 can identify the amount of use the first tool has received and the types of use that the first tool has received.

Further, FIG. 5 shows the method can include an act 530 of automatically creating a service order. Act 530 can comprise automatically creating a service order to service the first tool beautiful before the first tool is predicted to fail. For example, once the analytics server 300 identifies a predicted lifetime for a particular cutting and creasing tool, the analytics server can automatically order a replacement cutting and creasing tool through the service order server 310. In at least one implementation, the analytics server 300 orders a replacement cutting and creasing tool sufficiently early that the cutting and creasing tool can arrive at the packaging system before the installed cutting and creasing tool is predicted to fail.

By gathering and analyzing data from multiple packaging systems, the analytics server 300 can identify patterns and correlations that are unique to on-demand custom packaging systems. For example, many on-demand custom packaging systems may continually be creating unique patching templates using a wide variety of different corrugate types. This presents unique problems in identifying and predicting the wear and maintenance cycle of packaging systems. For instance, a first packaging system may predominantly process a thin corrugate, creating packaging templates that primarily consist of creases. In contrast, a second packaging system may primarily process a thick corrugate, creating packaging templates that include a significant number of cuts.

The different usage patterns of the two packaging systems will likely create significantly different maintenance schedules and failure points for the same components within the respective packaging systems. To add an additional level of complexity, at least some packaging systems 110 may alternate between thick and thin corrugates, significant numbers of cuts and significant numbers of creases, and various other production differences. Accordingly, implementations of the present system provide a novel system that can analyze a diversity of data and identify maintenance and cost information for many on-demand packaging systems.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for monitoring packaging system equipment and gathering consumption and diagnostic information comprising:
   one or more processors; and
   one or more computer-readable media having stored thereon executable instructions that when executed by the one or more processors configure the computer system to perform at least the following:
      receive a production indicator, wherein the production indicator is generated by a remote packaging template module and comprises information relating to an amount and types of boxes created by a first packaging system;
      receive a first tool indicator, wherein the first tool indicator comprises information received from a cutting and creasing sensor describing depths of cuts and lengths of cuts that a first tool has performed;
      create a first tool wear profile for the first packaging system, wherein creating the first tool wear profile comprises:
         accessing, within a database, tool indicator information received from other packaging systems, wherein the tool indicator information comprise information relating to a production life and a failure time of tools within the other packaging systems,
         identifying correlations between the tool indicator information from the other packaging systems and the first tool indicator, wherein the correlations identify an amount of wear attributable to a first type of corrugate on the first tool versus a second type of corrugate on the first tool, and
         generate the first tool wear profile, wherein the first tool wear profile comprises a predicted wear for the first tool based upon the identified correlations; and
      automatically create a service order to service the first tool before the first tool is predicted to fail.

2. The computer system of claim 1, wherein the executable instructions include instructions that are executable to configure the computer system to:
   receive, from a user, an indication that the first tool failed;
   determine the depths of cuts and the lengths of cuts that the first tool has performed; and
   update an algorithm used to calculate the first tool wear profile, wherein updating the algorithm comprises averaging the depths of cuts and the lengths of cuts that the first tool performed before failing with the depths of cuts and the lengths of cuts that other tools performed before failing.

3. The computer system of claim 1, wherein the executable instructions include instructions that are executable to configure the computer system to:
   receive a box failure indicator, wherein the box failure indicator comprises data relating to box damage that occurs during shipment;
   access, within the database, a listing of previously received box failure indicators;
   identify, within the database, similar boxes that have also failed;
   identify common features among the failures;
   determine that thicker corrugate should be used when a future box contents exceed a particular weight; and
   transmit to the first packaging system the corrective measure.

4. The computer system of claim 3, wherein identifying within the database similar boxes that have also failed comprises identifying boxes with the same corrugate thickness and a more than fifty percent of the same dimensions.

5. The computer system of claim 3, wherein identifying corresponding features among the failures comprises identifying common edges that have breached.

6. The computer system of claim 3, wherein identifying corresponding features among the failures comprises identifying common box contents.

7. A computer-implemented method for monitoring packaging system equipment and gathering consumption and diagnostic information, the computer-implemented method executed on one or more processors, the computer-implemented method comprising:
   receiving a production indicator, wherein the production indicator is generated by a remote packaging template module and comprises information relating to an amount and types of boxes created by a first packaging system;
   receiving a first tool indicator, wherein the first tool indicator comprises information received from a cutting and creasing sensor describing depths of cuts and lengths of cuts that a first tool has performed;

creating a first tool wear profile for the first packaging system, wherein creating the first tool wear profile comprises:
    accessing, within a database, tool indicator information received from other packaging systems, wherein the tool indicator information comprise information relating to a production life and a failure time of tools within the other packaging systems,
    identifying correlations between the tool indicator information from the other packaging systems and the first tool indicator, wherein the correlations identify an amount of wear attributable to a first type of corrugate on the first tool versus a second type of corrugate on the first tool, and
    generate the first tool wear profile, wherein the first tool wear profile comprises a predicted wear for the first tool based upon the identified correlations; and
automatically creating a service order to service the first tool before the first tool is predicted to fail.

8. The computer-implemented method of claim 7, further comprising:
receiving, from a user, an indication that the first tool failed;
determining the depths of cuts and the lengths of cuts that the first tool has performed; and
updating an algorithm used to calculate the first tool wear profile, wherein updating the algorithm comprises averaging the depths of cuts and the lengths of cuts that the first tool performed before failing with the depths of cuts and the lengths of cuts that other tools performed before failing.

9. The computer-implemented method of claim 7, further comprising:
receiving a box failure indicator, wherein the box failure indicator comprises data relating to box damage that occurs during shipment;
accessing, within the database, a listing of previously received box failure indicators;
identifying, within the database, similar boxes that have also failed;
identifying common features among the failures;
determining that thicker corrugate should be used when a future box contents exceed a particular weight; and
transmitting to the first packaging system the corrective measure.

10. The computer-implemented method of claim 9, wherein identifying within the database similar boxes that have also failed comprises identifying boxes with the same corrugate thickness and a more than fifty percent of the same dimensions.

11. The computer-implemented method of claim 9, wherein identifying corresponding features among the failures comprises identifying common edges that have breached.

12. The computer-implemented method of claim 9, wherein identifying corresponding features among the failures comprises identifying common box contents.

13. A computer-readable media comprising one or more physical computer-readable storage media having stored thereon computer-executable instructions that, when executed at a processor, cause a computer system to perform a method for monitoring packaging system equipment and gathering consumption and diagnostic information, the method comprising:
receiving a production indicator, wherein the production indicator is generated by a remote packaging template module and comprises information relating to an amount and types of boxes created by a first packaging system;
receiving a first tool indicator, wherein the first tool indicator comprises information received from a cutting and creasing sensor describing depths of cuts and lengths of cuts that a first tool has performed;
creating a first tool wear profile for the first packaging system, wherein creating the first tool wear profile comprises:
    accessing, within a database, tool indicator information received from other packaging systems, wherein the tool indicator information comprise information relating to a production life and a failure time of tools within the other packaging systems,
    identifying correlations between the tool indicator information from the other packaging systems and the first tool indicator, wherein the correlations identify an amount of wear attributable to a first type of corrugate on the first tool versus a second type of corrugate on the first tool, and
    generate the first tool wear profile, wherein the first tool wear profile comprises a predicted wear for the first tool based upon the identified correlations; and
automatically creating a service order to service the first tool before the first tool is predicted to fail.

14. The computer-readable media of claim 13, wherein the computer-executable executable instructions include instructions that are executable to configure the computer system to:
receive, from a user, an indication that the first tool failed;
determine the depths of cuts and the lengths of cuts that the first tool has performed; and
update an algorithm used to calculate the first tool wear profile, wherein updating the algorithm comprises averaging the depths of cuts and the lengths of cuts that the first tool performed before failing with the depths of cuts and the lengths of cuts that other tools performed before failing.

15. The computer-readable media of claim 13, wherein the computer-executable executable instructions include instructions that are executable to configure the computer system to:
receive a box failure indicator, wherein the box failure indicator comprises data relating to box damage that occurs during shipment;
access, within the database, a listing of previously received box failure indicators;
identify, within the database, similar boxes that have also failed;
identify common features among the failures;
determine that thicker corrugate should be used when a future box contents exceed a particular weight; and
transmit to the first packaging system the corrective measure.

16. The computer-readable media of claim 15, wherein identifying within the database similar boxes that have also failed comprises identifying boxes with the same corrugate thickness and a more than fifty percent of the same dimensions.

17. The computer-readable media of claim 15, wherein identifying corresponding features among the failures comprises identifying common edges that have breached.

18. The computer-readable media of claim 15, wherein identifying corresponding features among the failures comprises identifying common box contents.

* * * * *